United States Patent [19]

Hammer et al.

[11] Patent Number: 5,206,332
[45] Date of Patent: Apr. 27, 1993

[54] CURING AGENT FOR THE PRODUCTION OF LOW GLOSS POWDER COATINGS BASED ON EPOXY RESINS

[75] Inventors: Benedikt Hammer; Thomas Guthner; Helmut Hintermaier, all of Trostberg, Fed. Rep. of Germany

[73] Assignee: SKW Trostberg Aktiengesellschaft, Trostberg, Fed. Rep. of Germany

[21] Appl. No.: 813,397

[22] Filed: Dec. 27, 1991

[30] Foreign Application Priority Data

Dec. 29, 1990 [DE] Fed. Rep. of Germany ........ 4042191

[51] Int. Cl.$^5$ ................. C07D 251/32; C07D 251/18; C08G 59/00; C08G 59/50
[52] U.S. Cl. .................................... 528/118; 528/117; 528/94; 252/182.12; 252/182.13; 544/192; 544/222; 548/347.1; 548/355.1; 548/314.4; 548/353.1; 548/354.1
[58] Field of Search ................ 544/192, 222; 548/347, 548/349, 355; 252/182.12, 182.13; 528/118, 117, 94

[56] References Cited

U.S. PATENT DOCUMENTS

| | | | |
|---|---|---|---|
| 2,813,862 | 11/1957 | Arens | 548/347 X |
| 4,109,089 | 8/1978 | De Cooker et al. | 544/192 |
| 4,189,577 | 2/1980 | Sawa et al. | 544/222 |
| 4,514,556 | 4/1985 | Sawa et al. | 252/182.13 |
| 4,529,537 | 7/1985 | Dockner et al. | 252/182.13 |

FOREIGN PATENT DOCUMENTS

| | | | |
|---|---|---|---|
| 0411456 | 2/1985 | European Pat. Off. | 548/347 |
| 0151530 | 8/1991 | European Pat. Off. | 544/192 |
| 0276866 | 3/1990 | German Democratic Rep. | 544/192 |
| 1212276 | 11/1970 | United Kingdom | 548/349 |

OTHER PUBLICATIONS

Allied Chemical Product Bulletin, 1959 "Cyanuric Acid".

Primary Examiner—Floyd D. Higel
Attorney, Agent, or Firm—Nikaido, Marmelstein, Murray & Oram

[57] ABSTRACT

A curing agent for the production of low gloss powder coatings based on epoxy resins consists essentially of a mixture of the components a) 2-imidazoline derivative having a melting point of >60° C. and b) cyanuric acid as well as, if desired, anticaking agents or/and stabilizers. The low gloss powder coatings produced with these curing agents have the desired low degrees of gloss and good adhesive strengths, they form smooth and uniform surfaces and show no signs of yellowing even after long stoving times.

30 Claims, No Drawings

CURING AGENT FOR THE PRODUCTION OF LOW GLOSS POWDER COATINGS BASED ON EPOXY RESINS

The invention concerns curing agents for the production of low gloss powder coatings based on epoxy resins as well as a process for curing corresponding epoxy resins.

Thermo-setting powder coating systems based on epoxy resin are usually used nowadays to produce flat coatings, which are being increasingly used mainly for decorative purposes.

Since when using the usual curing agents based on amines or acid anhydrides, coatings are obtained which only have a more or less intense glossy appearance, one is forced to fall back upon special curing agents for low gloss powder coatings. A major problem with these curing agents is that they should produce flat and uniform coatings which in addition must have an adequate adhesion to the respective surface.

The only curing systems which up to now have been able to fulfil these requirements in a satisfactory manner are salts of 2-phenylimidazoline with polycarboxylic acids having at least three carboxyl groups such as those described in DE-PS 23 24 696.

Aromatic carboxylic acids, such as e.g. pyromellitic acid, are preferably used as polycarboxylic acids. However, a drawback of these acids is that they are very expensive and are only available in a limited amount. In addition the corresponding salts have to be especially prepared by reacting the acids with 2-phenylimidazoline in suitable solvents which require a certain technical expenditure.

The object of the present invention is therefore to develop curing agents for the production of low gloss powder coatings based on epoxy resins which do not have the said disadvantages of the state of the art but are relatively simple to produce and at the same time have good technical properties for their application.

This object is achieved according to the present invention by a curing agent which consists of a mixture of
a) 2-imidazoline derivative with a melting point >60° C. and
b) cyanuric acid as well as, if desired, anticaking agents or/and stabilizers It surprisingly turned out that smooth and uniform low gloss powder coatings with a good adhesion and an excellent matt finish can be obtained using these curing agents.

Since the two components, 2-imidazoline derivative with a melting point >60° C. and cyanuric acid (2,4,6-trihydroxy-1,3,5-triazine), are present as physical mixtures an expensive reaction for the salt formation can be omitted.

The 2-imidazoline derivative is preferably a compound having the general formula I

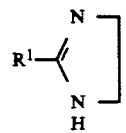 (I)

in which $R^1$ denotes an alkyl residue with 10 to 20 carbon atoms,

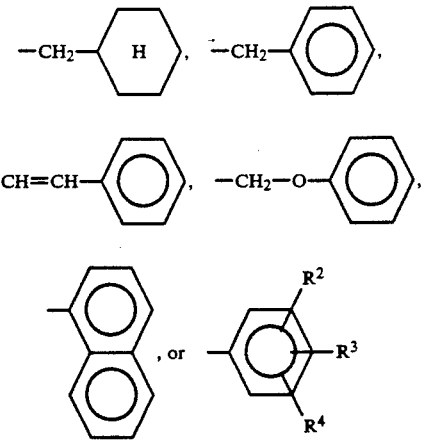

and $R^2$, $R^3$, $R^4$ each denote independently of one another H, a $C_1$-$C_4$ alkyl group, $-NO_2$, $-Cl$, $-OCH_3$ or

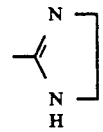

The ratio of both the said components can be varied in a wide range but it has proven to be particularly advantageous to adjust the ratio by weight of 2-imidazoline derivative to cyanuric acid to 90:10 to 20:80, since in this case low gloss powder coatings with especially excellent properties are obtained. It is, however, in principle also possible to increase the proportion of 2-imidazoline derivative to over 90% by weight, but in this case there is a risk of obtaining relatively high degrees of gloss with certain epoxy resin formulations.

If the proportion of cyanuric acid in the mixture exceeds 80% by weight it is possible that the curing or adhesive strength is no longer optimal.

Using the two-component curing agent according to the present invention it is possible to regulate the degree of gloss or the curing properties by varying the ratios by weight over a wide range.

In order to improve the technical properties of application, the curing agent can in addition contain special additives within the scope of the invention. Thus it is recommended to add anticaking agents such as e.g. white silica to the curing agent in order to improve the flow properties. In this connection precipitated or pyrogenic silica which is usually used in an amount of 0.2 to 5% by weight in relation to the weight of the curing agent, are equally suitable.

In addition the curing agent can also contain stabilizers which prevent salt formation between the 2-imidazoline derivative and the cyanuric acid especially at higher temperatures. In particular waxes such as e.g. polyethylene waxes but also stearates such as e.g. zinc stearate have proven to be especially advantageous for this whereby it is expedient to use amounts of 0.5 to 5% by weight in relation to the weight of the curing agent.

It is expedient to use the curing agents according to the present invention in a finely dispersed form in order to facilitate a uniform dispersion and to develop an optimal effect. The particle size of the curing agent should therefore be <100 μm, preferably <50 μm.

The production of the curing agent according to the present invention can be carried out in a technically simple manner by intensively mixing the two components and, if desired, the additives and subsequently grinding the mixture to the desired particle size whereby the usual technical methods and devices can be used for this. However, it is also possible to mix together the individual components which have been previously ground accordingly.

The mixtures of substances obtained in this way are suitable for curing epoxy resins especially in the production of low gloss powder coatings The usual solid resins come into consideration as the epoxy resins which on average have more than one 1,2-epoxy group and a lower melting point of >40° C. These epoxy resins can be saturated or unsaturated, aliphatic, cycloaliphatic, aromatic or heterocyclic and they may contain substituents such as halogens, phosphorus and hydroxyl groups etc.

In order to achieve the especial advantages according to the present invention it is expedient to use the recommended curing agents in an amount of 1 to 30% by weight, in particular of 5 to 20% by weight, in relation to the weight of the epoxy resin.

Further additives such as e.g. pigments, filling agents and, if desired, dyes or auxiliary flow-control agents etc. in the usual amounts can be added to the epoxy resin and the curing agent according to the present invention for formulating the powder coatings.

This powder coating mixture is extruded before its use and then ground to the desired particle size.

Subsequently the finely dispersed powder coating is sprayed onto the objects to be coated and the curing is carried out at temperatures of 140° C. to 220° C., preferably 180° C. to 200° C.

The low gloss powder coatings produced in this way have the desired low degrees of gloss and good adhesive strength, they form smooth and uniform surfaces and do not show yellowing even after a longer storing time.

Because of these excellent technical application properties of the low gloss powder coatings obtained and because of their ready availability the curing agents according to the present invention are particularly well suited for technical applications.

The following examples should elucidate the invention further.

EXAMPLES

The curing agents according to the present invention are produced by mixing the 2-imidazoline derivative and cyanuric acid in the respective ratio and, if desired, by adding anticaking agents and stabilizers as well as by grinding of the complete mixture to <50 μm.

These mixtures of curing agents were added to the epoxy resin together with further additives, if desired, such as pigments, filling agents etc., they are extruded after mixing and subsequently ground to a particle size of <100 μm. The final finely-dispersed powder coating composition was then sprayed onto steel plates (size 10 ×10×0.5 cm) in a layer thickness of ca. 0.04 mm and hardened at the stated temperatures. The low gloss powder coatings obtained in this way were examined with respective to degree of gloss, adhesive strength, surface properties as well as yellowing.

EXAMPLE 1 a) Composition of the curing agent:
45 parts by weight 2-phenylimidazoline
54 parts by weight cyanuric acid
1 part by weight precipitated, hydrophobic silica (Sipernat D17 from Degussa)
b) Composition of the powder coating:
42 parts by weight epoxy resin DER663U (from Dow)
9 parts by weight epoxy resin/auxiliary flow-control agent XB3032 (from Ciba-Geigy)
4.1 parts by weight curing agent mixture
2 parts by weight PE wax (Ceridust 9615 A from Hoechst)
28 parts by weight pigment (TiO$_2$ R-TC)
14.9 parts by weight filling agent (Durcal 5)
c) Properties of the low gloss powder coating:
degree of gloss (60° C.): (10 min. 200° C.): 15 (according to Gardner): (10 min. 180° C.): 19
Erichsen indentation: 5.0/4.5 mm (DIN 53 156)
optical test: smooth, uniform coating; no yellowing

EXAMPLE 2 a) Composition of the curing agent
35 parts by weight 2-phenylimidazoline
64 parts by weight cyanuric acid
1 part by weight precipitated, hydrophobic silica (Sipernat D17 from Degussa)
b) Composition of the powder coating:
The composition of the powder coating corresponds to Example 1, however, a curing agent composition according to Example 2a) was used.
c) Properties of the low gloss powder coating:
degree of gloss (60° C.): (10 min. 200° C.): 4.0 (according to Gardner): (10 min. 180° C.): 4.5
Erichsen indentation: 2.5 mm (DIN 53 156)
optical test: smooth, uniform coating; no yellowing

EXAMPLE 3 a) Composition of the curing agent:
44 parts by weight 2-phenylimidazoline
53 parts by weight cyanuric acid
1 part by weight zinc stearate (Zincum 5 from Bärlocher)
1 part by weight precipitated, hydrophobic silica (Sipernat D17 from Degussa)
1 part by weight polyethylene wax (PE520 from Hoechst)
b) Composition of the powder coating:
The composition of the powder coating corresponds to Example 1, however, a curing agent composition according to Example 3a) was used.
c) Properties of the low gloss powder coating:
degree of gloss (60° C.): (10 min. 200° C.): 5.3 (according to Gardner): (10 min. 180° C.): 5.4
Erichsen indentation: 3.0 mm
optical test: smooth, uniform coating; no yellowing

EXAMPLE 4 a) Composition of the curing agent:
45 parts by weight 1,4-bis(2-imidazolinyl)benzene
54 parts by weight cyanuric acid
1 part by weight precipitated, hydrophobic silica (Sipernat D17 from Degussa)
b) Composition of the powder coating: identical to that of Example 1
c) Properties of the low gloss powder coating degree of gloss (60° C.): (10 min. 200° C.): 40 (according to Gardner) (10 min. 180° C.): 40
Erichsen indentation: 0.8 mm
optical test: smooth, uniform coating; no yellowing

EXAMPLE 5 a) Composition of the curing agent:
45 parts by weight 1,3-bis(2-imidazolinyl)benzene
54 parts by weight cyanuric acid
1 part by weight precipitated, hydrophobic silica (Sipernat D17 from Degussa)

b) Composition of the powder coating: identical to that of Example 1 c) Properties of the low gloss powder coating: degree of gloss (60° C.): (10 min. 200° C.): 37 (according to Gardner): (10 min. 180° C.): 39
Erichsen indentation: 1.1 mm
optical test: smooth, uniform coating; no yellowing

We claim:

1. A curing agent composition for curing an epoxy resin comprising:
    a mixture of:
        a 2-imidazoline derivative having a melting point of greater than 60° C.; and cyanuric acid
    wherein the proportions of the components of said curing agent to each other, and the proportion of said curing agent to said epoxy resin cured are sufficient to cure said resin into a low gloss coating and sufficient to provide substantial adhesiveness of said low gloss coating to a substrate.

2. A curing agent composition as claimed in claim 1, wherein the 2-imidazoline derivative is a compound having the formula

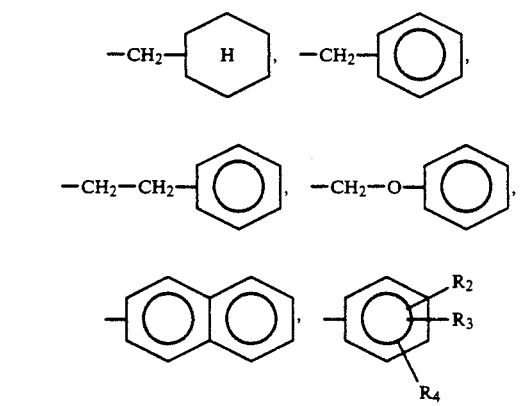

in which $R^1$ represents an alkyl residue with 10 to 20 carbon atoms, and $R^2$, $R^3$, $R^4$ each denote independently of one another H, a $C_1$-$C_4$ alkyl group, —$NO_2$, —Cl, —$OCH_3$ or

3. A curing agent composition as claimed in claim 1 wherein the ratio by weight of the 2-imidazoline derivative to cyanuric acid is 90:10 to 20:80.

4. A curing agent composition as claimed in claim 1 containing in addition an anticaking agent in an amount from 0.2 to 5% by weight in relation to the weight of the curing agent.

5. A curing agent composition as claimed in claim 1, containing in addition pyrogenic and/or precipitated silica as the anticaking agent.

6. A curing agent composition as claimed in claim 1, containing in addition stabilizers in an amount of 0.5 to 5% by weight in relation to the weight of the curing agent.

7. A curing agent composition as claimed in claim 6 containing in addition was as the stabilizer.

8. A curing agent composition as claimed in claim 6, containing in addition a stearate as the stabilizer.

9. A curing agent composition as claimed in claim 1 wherein the size of the particles are <100 μm.

10. A curing agent composition as claimed in claim 7 wherein said stabilizer is a polyethylene was.

11. A curing agent composition as claimed in claim 8 wherein said stabilizer is zinc stearate.

12. A curing agent composition as claimed in claim 9 wherein said curing agent particles are less than about 50 μm in size.

13. An epoxy resin powder composition comprising:
    an epoxy resin: and
    as a curing agent, a combination of:
        a 2-imidazoline derivative having a melting point of greater than 60° C.; and
        cyanuric acid
    wherein the proportions of the components of said curing agent to each other, and the proportion of said curing agent to said epoxy resin being sufficient to cure said powder into a low gloss coating and sufficient to provide substantial adhesiveness of said low gloss coating to a substrate.

14. An epoxy resin as claimed in claim 13, wherein the 2-imidazoline derivative is a compound having the formula

in which $R^1$ represents an alkyl residue with 10 to 20 carbon atoms,

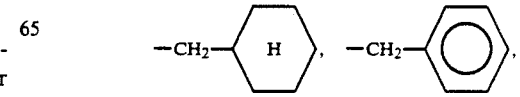

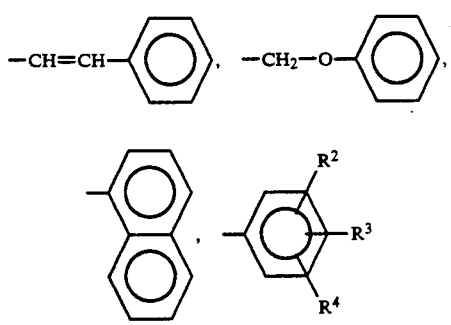

and $R^2$, $R^3$, $R^4$ each denote independently of one another H, a $C_1$-$C_4$ alkyl group, $-NO_2$, $-Cl$, $-OCH_3$ or

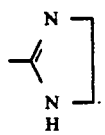

15. An epoxy resin composition as claimed in claim 13 wherein the ratio by weight of the 2-imidazoline derivative to cyanuric acid is 90:10 to 20:80.

16. An epoxy resin composition as claimed in claim 13 containing in addition an anticaking agent in an amount from 0.2 to 5% by weight in relation to the weight of the curing agent.

17. An epoxy resin composition as claimed in claim 16, containing in addition pyrogenic and/or precipitated silica as the anticaking agent.

18. An epoxy resin composition as claimed in claim 13, containing in addition stabilizers in an amount of 0.5 to 5% by weight in relation to the weight of the curing agent.

19. An epoxy resin composition as claimed in claim 18, containing in addition wax as the stabilizer.

20. An epoxy resin composition as claimed in claim 18, containing in addition a stearate as the stabilizer.

21. An epoxy resin composition as claimed in claim 13 wherein the size of the particles of said curing agent is <100 μm.

22. An epoxy resin composition as claimed in claim 15 wherein said stabilizer is a polyethylene wax.

23. An epoxy resin composition as claimed in claim 16 wherein said stabilizer is zinc stearate.

24. An epoxy resin composition as claimed in claim 17, wherein said curing agent particles are less than about 50 μm in size.

25. A smooth surfaced, low gloss, cured epoxy resin comprising the product of subjecting the composition as claimed in claim 13 to an elevated temperature for a time sufficient to react said resin with said curing agent.

26. Process for curing epoxy resins to produce low gloss powder coatings, comprising curing said resin with a curing agent as claimed in claim 1 in an amount of 1 to 30% by weight in relation to the weight of the epoxy resin.

27. Process as claimed in claim 26, wherein the curing agent is used in an amount of 5 to 20% by weight in relation to the weight of the epoxy resins.

28. Process as claimed in claim 26, wherein the curing is carried out at a temperature between 140° C. and 220° C.

29. Process as claimed in claim 28, wherein the curing is carried out at 180° C. to 200° C.

30. The product of the process of claim 26 which is a smooth surfaced, low gloss, cured epoxy resin wherein said resin and said curing agent are subjected to an elevated temperature for a time sufficient to react said resin with said curing agent.

* * * * *